US011669940B2

(12) United States Patent
Walter et al.

(10) Patent No.: US 11,669,940 B2
(45) Date of Patent: Jun. 6, 2023

(54) APPARATUS AND METHOD FOR BASELINE ESTIMATION IN INPUT SIGNAL DATA

(71) Applicant: LEICA MICROSYSTEMS CMS GMBH, Mannheim (DE)

(72) Inventors: Kai Walter, Schriesheim (DE); Florian Ziesche, Mannheim (DE)

(73) Assignee: LEICA MICROSYSTEMS CMS GMBH, Mannheim (DE)

( * ) Notice: Subject to any disclaimer, the term of this patent is extended or adjusted under 35 U.S.C. 154(b) by 333 days.

(21) Appl. No.: 17/042,194

(22) PCT Filed: Mar. 29, 2019

(86) PCT No.: PCT/EP2019/058084
§ 371 (c)(1),
(2) Date: Sep. 28, 2020

(87) PCT Pub. No.: WO2019/185912
PCT Pub. Date: Oct. 3, 2019

(65) Prior Publication Data
US 2021/0118101 A1    Apr. 22, 2021

(30) Foreign Application Priority Data

Mar. 29, 2018 (DE) ............... 10 2018 204 943.2
Jun. 27, 2018 (WO) ............... PCT/EP2018/067244

(51) Int. Cl.
*G06K 9/00* (2022.01)
*G06T 5/00* (2006.01)
(Continued)

(52) U.S. Cl.
CPC ............ *G06T 5/003* (2013.01); *G02B 7/38* (2013.01); *G02B 21/12* (2013.01); *G02B 21/244* (2013.01);
(Continued)

(58) Field of Classification Search
CPC .......... G06T 5/003; G06T 5/002; G06T 5/10; G06T 5/20; G06T 7/0012;
(Continued)

(56) References Cited

FOREIGN PATENT DOCUMENTS

EP      2344874 B1   3/2013
WO    WO 99/05503 A2   2/1999

OTHER PUBLICATIONS

Bouwman, Job G., and Chris JG Bakker. "Alias subtraction more efficient than conventional zero-padding in the Fourier-based calculation of the susceptibility induced perturbation of the magnetic field in MR." Magnetic resonance in medicine 68.2 (2012): 621-630. (Year: 2012).*

(Continued)

*Primary Examiner* — Jonathan S Lee
(74) *Attorney, Agent, or Firm* — Leydig, Voit & Mayer, Ltd.

(57) ABSTRACT

An apparatus for baseline estimation in input signal data is configured to retrieve input signal data ($I(x_i)$) and to subtract baseline estimation data ($f(x_i)$) from the input signal data ($I(x_i)$) to compute output signal data. The apparatus is further configured to compute the baseline estimation data ($f(x_i)$) from a convolution using a discrete Green's function ($G(x_i)$).

15 Claims, 5 Drawing Sheets

(51) Int. Cl.
*G06T 5/10* (2006.01)
*G06T 5/20* (2006.01)
*H04L 25/02* (2006.01)
*G06V 10/30* (2022.01)
*G06F 17/13* (2006.01)
*G06F 17/15* (2006.01)
*G06T 7/00* (2017.01)
*G02B 7/38* (2021.01)
*G02B 21/12* (2006.01)
*G02B 21/24* (2006.01)
*H04N 25/615* (2023.01)

(52) U.S. Cl.
CPC .............. *G06F 17/13* (2013.01); *G06F 17/15* (2013.01); *G06T 5/002* (2013.01); *G06T 5/10* (2013.01); *G06T 5/20* (2013.01); *G06T 7/0012* (2013.01); *G06V 10/30* (2022.01); *H04L 25/025* (2013.01); *H04N 25/615* (2023.01); *G06T 2207/10056* (2013.01); *G06T 2207/10068* (2013.01); *G06T 2207/20056* (2013.01); *G06T 2207/20081* (2013.01); *G06T 2207/20084* (2013.01); *G06T 2207/30024* (2013.01)

(58) Field of Classification Search
CPC . G06T 2207/10056; G06T 2207/10068; G06T 2207/20056; G06T 2207/20081; G06T 2207/20084; G06T 2207/30024; G06F 17/13; G06F 17/15; G06V 10/30; G06V 10/431; H04L 25/025
USPC ....................................................... 382/157
See application file for complete search history.

(56) References Cited

OTHER PUBLICATIONS

Lee, Dongwook, Jaejun Yoo, and Jong Chui Ye. "Deep artifact learning for compressed sensing and parallel MRI." arXiv preprint arXiv:1703.01120 (2017). (Year: 2017).*

Cheng, Yu-Chung N., Jaladhar Neelavalli, and E. Mark Haacke. "Limitations of calculating field distributions and magnetic susceptibilities in MRI using a Fourier based method." Physics in Medicine & Biology 54.5 (2009): 1169. (Year: 2009).*

Idier, J., "Convex Half-Quadratic Criteria and Interacting Auxiliary Variables for Image Restoration," IEEE, Transactions on Image Processing, 10(7), p. 1001-1009, Jul. 2001.

Mazet V. et al. "Background Removal from Spectra by Designing and Minimising a Non-Quadratic Cost Function," Chemometrics and Intelligent Laboratory Systems, vol. 76, p. 121-133, Apr. 28, 2005, XP027774984.

Preibisch, Stephan et al., "Efficient Bayesian-based multiview deconvolution," Nat. Methods, Jun. 2014, 11(6): 645-648.

De Rooi, Johan J. et al. "Mixture models for two-dimensional baseline correction, applied to artifact elimination in time-resolved spectroscopy," Analytica Chimica Acta, Elsevier, Amsterdam, NL, vol. 771, Feb. 16, 2013, pp. 7-13, XP028991906.

Eilers, Paul H. C. and Hans F.M. Boelens, "Baseline Correction with Asymmetric Least Squares Smoothing," Oct. 21, 2005, XP55532568.

Hyeonwoo Noh et al. "Learning Deconvolution Network for Semantic Segmentation," May 17, 2015, arXiv:1505.04366v1, pp. 1-10, XP055451349.

Charbonnier, P. et al. "Two deterministic half-quadratic regularization algorithms for computed imaging," Proceedings of the International Conference on Image Processing (ICIP), Austin, Nov. 13-16, 1; Los Alamitos, IEEE Comp. Soc. Press, US, vol. 2, Nov. 13, 1994, pp. 168-172, XP010146138.

Anonymous, "Vector processor—Wikipedia," Dec. 6, 2016, XP055590744.

* cited by examiner

APPARATUS AND METHOD FOR BASELINE ESTIMATION IN INPUT SIGNAL DATA

CROSS-REFERENCE TO PRIOR APPLICATIONS

This application is a U.S. National Phase Application under 35 U.S.C. § 371 of International Application No. PCT/EP2019/058084, filed on Mar. 29, 2019, and claims benefit to German Patent Application No. DE 10 2018 204 943.2, filed on Mar. 29, 2018, and International Patent Application No. PCT/EP2018/067244, filed on Jun. 27, 2018. The International Application was published in English on Oct. 3, 2019, as WO 2019/185912 A1 under PCT Article 21(2).

FIELD

The invention relates to an apparatus and a method for baseline estimation in input signal data.

BACKGROUND

When a two-dimensional image of a three-dimensional region is recorded using an optical device such as a camera, only those features will be rendered sharply that are in the focal region. Items that are not in the focal region are blurred. This out-of-focus contribution to the image leads to artifacts that are not removed by standard engines and methods for image sharpening such as deconvolution.

SUMMARY

In an embodiment, the present invention provides an apparatus for baseline estimation in input signal data. The apparatus is configured to retrieve input signal data ($I(x_i)$) and to subtract baseline estimation data ($f(x_i)$) from the input signal data ($I(x_i)$) to compute output signal data. The apparatus is further configured to compute the baseline estimation data ($f(x_i)$) from a convolution using a discrete Green's function ($G(x_i)$).

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

Embodiments of the present invention provide an apparatus and method which removes the out-of-focus or baseline contribution in signals, such as images, that are represented by the input signal data.

Noise content, which has characteristics similar to the out-of-focus or baseline contribution in images, may be present in various types of input signal data caused e.g. by aliasing, by a noisy background, by non-linear absorption and/or scattering effects, and/or by moving signal sources and/or reflection targets. It is therefore provided by embodiments of the invention to remove noise components in the input signal data that are similar in characteristics to an out-of-focus contribution in an image.

An embodiment of the present invention provides an apparatus, wherein the apparatus is configured to retrieve input signal data; to subtract baseline estimation data from the input signal data to compute the output signal data; and wherein the apparatus is further configured to compute the baseline estimation data from a convolution using a discrete Green's function.

Another embodiment of the present invention provides a method, the method comprising the steps of obtaining baseline estimation data and of subtracting the baseline estimation data from the input signal data to obtain output signal data, wherein the step of obtaining the baseline estimation data comprises the steps of computing the baseline estimation data using a convolution with a discrete Green's function.

A further embodiment of the present invention provides a non-transitory computer readable medium storing a program causing a computer to execute the method according to an embodiment of the present invention.

A further embodiment of the present invention provides a computer program with a program code for performing the noise-reduction method according to an embodiment of the invention, when the computer program is run on a processor; by output signal data being the result of executing the claimed method; and/or by a neural network device trained by input and output signal data, where the output signal data are created from the input signal data by the method according to an embodiment of the present invention.

In the following, embodiments of the invention are described with reference to input signal data that only by way of example may represent input image data. However, beyond input image data, the term 'color' in general may relate to an input signal strength or intensity at a particular wavelength or in a particular wavelength band. The term 'color' is not necessarily restricted to image input data, but may also relate to other types of input data such as listed further below. The term 'color space' equally is not restricted to input image data but may designate any set of input signal data that has been recorded at different—overlapping or non-overlapping—wavelengths or wavelength bands. A wavelength in this context may correspond to a spatial or a temporal wavelength, i.e. be related to a temporal or spatial frequency. The set of wavelengths or wavelength bands, in which the input or output signal is recorded, corresponds to the 'color space'. Each one of these wavelengths or wavelength bands constitutes a separate 'channel' or 'color channel'.

For example, the input signal data may be one of input image data, input sonar, sound and/or ultrasound data, input radar data, input spectroscopy and/or spectral data including cepstra, input microwave data, input vibrational data, such as seismographic data, input tomography data of any kind of tomography and statistical data such as stock exchange data, as well as any combination thereof. The input signal data may be one of one-dimensional, two-dimensional, three-dimensional and N-dimensional.

The output signal data may be one of output image data, output sonar, sound or ultrasound data, output radar data, output spectroscopy and/or spectral data including cepstra, output microwave data, output vibrational data, such as seismographic data, and statistical data, such as stock exchange data, as well as any combination thereof. The output signal data may be one of one-dimensional, two-dimensional, three-dimensional and N-dimensional. The output signal data may be output for further processing.

In input signal data such as sonar, sound and ultrasound data, which may already may be considered as image data, a baseline estimation as described herein may be used to remove the background. In statistical data, the baseline estimation described herein may be used to remove and/or correct global trends.

In a more general term, the baseline estimation method described herein may be used not only to remove the baseline estimate from the input signal data, but to separate the baseline contribution $I_2(x_i)$ from the "in-focus" contribution $I_1(x_i)$. These two components may then be processed and, ultimately, analyzed separately. For example, in spectral data, in particular hyperspectral data, large-scale baseline spectral features may be separated from small-scale spectral features.

The input signal data is preferably an N-dimensional array $I(x_i)$, where N is an integer larger than 2.

The term $x_i$ is a shortcut notation for a tuple $\{x_1; \ldots; x_N\}$ containing N location values and representing a discrete location $x_i$—or the position vector to that location—in the array. The location $x_i$ may be represented by a pixel or a preferably coherent set of pixels in the input signal data. The discrete location $x_i$ denotes e.g. a pair of discrete location variables $\{x_1; x_2\}$ in the case of two-dimensional input signal data and a triplet of discrete location variables $\{x_1; x_2; x_3\}$ in the case of three-dimensional input signal data. In the i-th dimension, the array may contain $M_i$ locations, i.e. $x_i = \{x_{i,1}, \ldots, x_{i,M_i}\}$. In total, $I(x_i)$ may contain $(M_1 \times \ldots \times M_N)$ elements. As, in the following, no reference will be made to a concrete location or a concrete dimension, the location is indicated simply by $x_i$.

$I(x_i)$ can be any value or combination of values at the location $x_i$, such as a value representing an intensity of a color or "channel" in a color space, e.g. the intensity of the color R in RGB space, or a combined intensity of more than one color, e.g. R+G+B/3 in RGB color space. Input images that have been recorded by a multispectral or hyperspectral camera may contain more than three channels. The same is true for other types of input signal data.

For example, two-dimensional input signal data may be input image data, which are available in a three-color RGB format may be regarded as three independent sets of two-dimensional input signal data $I(x_i) = \{I_R(x_i); I_G(x_i); I_B(x_i)\}$, where $I_R(x_i)$ represents a value such as the intensity of the color R, $I_G(x_i)$ represents a value such as the intensity of the color G and $I_B(x_i)$ represents a value such as the intensity of the color B. Alternatively, each color may be considered as constituting a separate input image and thus separate input signal data.

If the input signal data have been recorded using a multispectral camera or a hyperspectral camera, more than three channels may be represented by the input signal data. Each channel may represent a different spectrum or spectral range of the light spectrum. For example, more than three channels may be used to represent the visible-light spectrum.

If the object contained fluorescent materials, such as at least one fluorophore or at least one auto-fluorescing substance, each channel may represent a different fluorescent spectrum. For example, if a plurality of fluorescing fluorophores is present in the input signal data, each fluorescence spectrum of one fluorophore may be represented by a different channel of the input signal data. Moreover, different channels may be used for fluorescence which is selectively triggered by illumination on one hand and auto-fluorescence which may be generated as a by-product or as a secondary effect of the triggered fluorescence on the other. Additional channels may cover the NIR and IR ranges. A channel may not necessarily contain intensity data, but may represent other kind of data related to the image of the object. For example, a channel may contain fluorescent lifetime data that are representative of the fluorescence lifetime after triggering at a particular location in the image. In general, the input signal data may thus have the form $$I(x_i) = \{I_1(x_i); I_2(x_1); \ldots; I_C(x_i)\},$$

where C is the total number of channels in the input signal data.

The apparatus and method according to embodiments of the invention start from the assumption that the in-focus contributions have a high spatial frequency e.g. are responsible for intensity and/or color changes which take place over a short distance in the input signal data. The out-of-focus contributions are assumed to have low spatial frequency, i.e. lead to predominantly gradual intensity and/or color changes that extend over larger areas of the input signal data. Thus, the out-of-focus contribution is reflected in a baseline of the input signal data.

Starting from this assumption, the intensity and/or color changes across the input signal data may be separated additively into a high spatial frequency in-focus component $I_1(x_i)$ and a low, here spatial, frequency out-of-focus or baseline component $I_2(x_i)$ as $$I(x_i) = I_1(x_i) + I_2(x_i).$$

Due to its low spatial frequency, the out-of-focus component $I_2(x_i)$ can be considered as a more or less smooth baseline on which the in-focus components are superimposed as features having high spatial frequency. According to an embodiment of the invention, the baseline is estimated using a fit to the input signal data. Computationally, the fit, i.e. the baseline estimate, is represented by discrete baseline estimation data $f(x_i)$. The baseline estimation data may also be a hypercube array having N dimensions and $(M_1 \times \ldots \times M_N)$ elements and thus have the same dimensionality as the input signal data.

The same deliberations of course apply if, instead of a spatial frequency, a temporal frequency is considered. In this case, the input signal data may e.g. represent a spectrum, cepstrum or a plurality of spectra or cepstra. The baseline estimation may thus be used to extract and/or eliminate either small-scale or large-scale (baseline) signal content in the spatial or frequency domain.

For computing the baseline estimation data, a least-square minimization criterion is preferably used, which is to be minimized for the fit. The exact formulation of the least-square minimization criterion determines the characteristics of the fit and thus of the baseline estimation data. An improper choice of a least-square minimization criterion may cause the baseline estimate to not represent the out-of-focus component with sufficient accuracy.

In order to ensure that the baseline estimation data are an accurate representation of the out-of-focus or baseline contributions in the input signal data and to avoid that the baseline estimation data are fitted to the in-focus contributions, the least-square minimization criterion according to an embodiment of the invention may comprise a penalty term. The penalty term is used to penalize an unwanted behavior of the baseline estimation data, such as representing components of the input signal data which have high spatial frequency content and therefore are thought to belong to the in-focus component of the input signal data.

Once the baseline estimation data have been determined and thus a baseline estimate $f(x_i)$ for $I_2(x_i)$ has been obtained, the deblurred output signal data $O(x_i)$ may be obtained from the baseline estimate and the input signal data. In particular, the output signal data may be computed by subtracting the baseline estimate from the input signal data:

$$O(x_i)=I(x_i)-f(x_i).$$

The output signal data $O(x_i)$ are preferably also represented by a discrete array having dimension N and $M_1 \times \ldots \times M_N$ elements and thus have preferably the same dimensionality as the input signal data and/or the baseline estimation data.

In this context, the term 'deblurred' output signal data denotes any output signal data from which the baseline estimate has been removed. As indicated above, this does not necessarily relate to image only, but to any signal data. The 'out-of-focus' component may thus be any noise component that has a characteristic that is similar to the characteristic of the 'out-of-focus' component in image data.

The inventive solution is different from what is known in the prior art, e.g. from the 'convoluted background subtraction' in the BioVoxxel toolbox. There, a background is subtracted from a convolved copy of the signal or, more particularly, the image and not directly from the (unconvolved) signal or image as according to an embodiment of the invention.

The above apparatus and method may be further improved by adding one or more of the features that are described in the following. Each of the following features may be added to the method and/or the apparatus of embodiments of the invention independently of the other features. Moreover, each feature has its own advantageous technical effect, as is explained hereinafter.

According to one embodiment, the apparatus, in particular a medical observation device, such as an endoscope or microscope, may be configured to store at least temporarily input signal data (preferably in an image storing section of the apparatus), such as input image data; to output deblurred output signal data (preferably by an output section of the apparatus), such as output image data; to remove, in particular subtract (preferably by an image processor of the apparatus, the image processor comprising a deblurring section), an out-of-focus or baseline contribution in the input signal, such as an image, from the input signal data, such as the input image data, to compute the output signal data, such as the output image data; to compute baseline estimation data (preferably by a baseline estimator engine of the apparatus) representing the out-of-focus contribution by a fit to at least a subset of the input signal data, such as the input image data, (preferably the baseline estimator engine of the apparatus) comprising a least-square minimization criterion, wherein the least-square minimization criterion preferably comprises a penalty term.

Further, the method may be a method for—in particular automatically—deblurring a signal such as an image, the signal, such as the image, being represented by input signal data, such as input image data, the method comprising the steps of—in particular automatically—estimating an out-of-focus or baseline contribution in the signal, such as the image, to obtain baseline estimation data and of removing, in particular subtracting, the baseline estimation data from the input signal data, such as the input image data, to obtain deblurred output signal data, such as output image data, wherein the step of estimating the out-of-focus contribution preferably comprises the step of computing the baseline estimation data as a to at least a subset of the input signal data, such as the input image data, by minimizing a least-square minimization criterion, and wherein the least-square minimization criterion preferably comprises a penalty term.

According to one embodiment, the polynomial fit may be done simultaneously in a plurality of dimensions, depending on the dimensions of the input signal data.

In one particular instance, the fit may be a polynomial fit to the input signal data. In particular, the baseline estimation data may be represented by a K-order polynomial in any of the N dimensions i:

$$f(x_i)=\Sigma_{k=0}^{K} a_{i,k} x_i^k = a_{i,0} + a_{i,1} x_i^1 + a_{i,2} x_i^2 + \ldots + a_{i,K} x_i^K,$$

where $a_{i,k}$ are the coefficients of the polynomial in the i-th dimension. For each dimension i=1, ..., N, a separate polynomial may be computed.

The optimum value for the maximum polynomial order K depends on the required smoothness of the baseline estimation data. For a smooth baseline, the polynomial order must be set as low as possible, whereas fitting a highly irregular background may require a higher order.

In the case of a polynomial fit, the baseline estimation data may consist only of the polynomial coefficients $a_{i,k}$. However, a polynomial fit might be difficult to control and not be precise because the only parameter that allows adjustment to the input signal data is the maximum polynomial order. The polynomial order can only take integer values. It might therefore not always be possible to find an optimum baseline estimation. A non-optimum polynomial fit may exhibit local minima in the baseline estimation, which might lead to annoying artifacts.

Therefore, according to another advantageous embodiment, the fit to the input signal data may be a spline fit, in particular a smoothing spline. A spline fit usually delivers more reliable results than a polynomial fit because it is simpler to control, e.g. in terms of smoothness, and robust to noise and creates less artifacts. On the other hand, the spline fit is computationally more complex than the polynomial fit because each pixel or, more generally, input signal value must be varied for minimizing the least-square minimization criterion.

According to one embodiment, the least-square minimization criterion $M(f(x_i))$ may have the following form:

$$M(f(x_i))=C(f(x_i))+P(f(x_i)),$$

where $C(f(x_i))$ is a cost function and $P(f(x_i))$ is the penalty term. The least-square minimization criterion, the cost function and the penalty term are preferably scalar values.

In one particular instance, the cost function represents the difference between the input signal data $I(x_i)$ and the baseline estimation data $f(x_i)$. For example, if $\varepsilon(x_i)$ denotes the difference term between the input signal data and the baseline estimation data as:

$$\varepsilon(x_i)=I(x_i)-f(x_i),$$

The cost function $C(f(x_i))$ may comprise the $L_2$-norm $\|\varepsilon(x_i)\|^2$, which is used here as a short hand notation of the sum of the root-mean-square values across all dimensions of the sum of squared differences between the input signal data and the baseline estimation data in the i-th dimension, i.e.

$$\|\varepsilon(x_i)\|^2=\Sigma_{i=1}^N\Sigma_{m=1}^{M_i}(I(x_{i,m})-f(x_{i,m}))^2.$$

The $L_2$-norm $\|\varepsilon(x_i)\|^2$ is a scalar value. An example of a cost function is:

$$C(f(x_i))=\|\varepsilon(x_i)\|^2$$

For improving the accuracy of the baseline estimate, it may be of advantage if the difference between the input signal data and the baseline estimate is truncated, e.g. by using a truncated difference term. A truncated difference term reduces the effects of peaks in the input signal data on the baseline estimation data. Such a reduction is beneficial if the in-focus contribution is assumed to reside in the peaks of $I(x_i)$. Due to the truncated difference term, peaks in the input signal data that deviate from the baseline estimate more than a predetermined constant threshold value s will be "ignored" in the cost function by truncating their penalty on the fit, in particular the spline fit, to the threshold value. Thus, the baseline estimation data will follow such peaks only to a limited amount. The truncated quadratic may be symmetric or asymmetric. The truncated difference term is denoted by $\varphi(\varepsilon(x_i))$ in the following.

In some applications, the in-focus contributions may be only or at least predominantly contained in the peaks in the input signal data, i.e. the bright spots of an image. This may be reflected by choosing a truncated quadratic term which is asymmetric and allows the fit, in particular the spline fit, to follow the valleys but not the peaks in the input signal data. For example, the asymmetric truncated quadratic $\varphi(\varepsilon(x_i))$ may be of the form $$\varphi(\varepsilon(x_i))=\begin{cases}\varepsilon(x_i)^2 & \text{if } \varepsilon(x_i)\leq s\\ s^2 & \text{else}\end{cases}.$$

If, in another particular application, valleys, i.e. dark areas or regions having low values in the input signal data, are also to be considered as in-focus contributions, a symmetric truncated quadratic may be used instead of the asymmetric truncated quadratic. For example, the symmetric truncated quadratic may have the following form:

$$\varphi(\varepsilon(x_i))=\begin{cases}\varepsilon(x_i)^2 & \text{if } |\varepsilon(x_i)|\leq s\\ s^2 & \text{else}\end{cases}.$$

Using a truncated quadratic, the cost function $C(f(x_i))$ preferably may be expressed as $$C(f(x_i))=\sum_{i=1}^N\sum_{m=1}^{M_i}\varphi(x_{i,m})$$

The penalty term $P(f(x_i))$ in the least-square minimization criterion $M(f(x_i))$ may take any form that introduces a penalty if the baseline estimate is fitted to data that are considered to belong to the in-focus component $I_1(x_i)$. A penalty is created in that the penalty term increases in value if the in-focus component in the input signal data component is represented in the baseline estimation data.

If e.g. one assumes that the out-of-focus component $I_2(x_i)$ is considered to have low spatial frequency, the penalty term may be a term that becomes large if the spatial frequency of the baseline estimate becomes large.

Such a term may be in one embodiment a roughness penalty term which penalizes non-smooth baseline estimation data that deviate from a smooth baseline. Such a roughness penalty term effectively penalizes the fitting of data having high spatial frequency.

According to one embodiment, a deviation from a smooth baseline may lead to large values in at least one of the first derivative, i.e. the steepness or gradient, and the second derivative, i.e. the curvature, of the baseline estimation data. Therefore, the roughness penalty term may contain at least one of a first spatial derivative of the baseline estimation data, in particular the square and/or absolute value of the first spatial derivative, and a second derivative of the baseline estimation data, in particular the square and/or absolute value of the second spatial derivative. More generally, the penalty term may contain a spatial derivative of any arbitrary order of the baseline estimation data, or any linear combination of spatial derivatives of the baseline estimation data. Different penalty terms may be used in different dimensions.

For example, the roughness penalty term $P(f(x_i))$ may be formed as $$P(f(x_i))=\Sigma_{j=1}^N\gamma_j\Sigma_{i=1}^N\Sigma_{m=1}^{M_i}(\partial_j^2 f(x_{i,m}))^2.$$

This roughness penalty term penalizes a large rate of change in the gradient of the baseline estimate or, equivalently, a high curvature, and thus favors smooth estimates. Herein, $\gamma_j$ is a regularization parameter and $\partial_j^2$ is a discrete operator for computing the second derivative in the j-th dimension. In the discrete, the differentiation may be computed efficiently using a convolution. For example, $$\partial_j^2 f(x_{i,m})=D_{i,m}^{(j)}*f(x_{i,m})$$

with a second order derivative matrix $$D_{i,m}^{(j)}=\begin{cases}1 & \text{if } m=1,\ M_j \text{ and } i=j\\ -2 & \text{if } m=0 \text{ and } i=j\\ 0 & \text{else}\end{cases}.$$

The regularization parameter $\gamma_j$ depends on the structure of the input signal or image data. It represents roughly the spatial length scales of the information in the in-focus signal data $I_1(x_i)$. The regularization parameter may be predetermined by a user and is preferably larger than zero. The unit of the regularization parameter is chosen such that the penalty function is a scalar, dimensionless quantity. Typically, the regularization parameter has values between 0.3 and 100.

It is preferred, however, that the roughness penalty term $P(f(x_i))$ is formed as $$P(f(x_i)) = \sum_{j=1}^{N} \gamma_j \sum_{i=1}^{N} \sum_{m=1}^{M_i} (\partial_j f(x_{i,m}))^2.$$

This is a roughness penalty term that penalizes large gradients in the baseline estimation data. The sum over j allows to use different penalty terms in different dimensions. It should be noted that, as $x_j$ and $f(x_i)$ are both discrete, the differentiation can be carried out by convolution with a derivative array $\partial_j$. The operator $\partial_j$ represents a discrete first-order derivative or gradient operator in the dimension j, which may be represented by an array.

Instead of or in addition to a derivative or a linear combination of derivatives of the baseline estimation data, the penalty term may contain a feature-extracting, in particular linear, filter or a linear combination of such filters. Feature-extracting filters may be a Sobel-filter, a Laplace-filter, and/or a FIR filter, e.g. a high-pass or band-pass spatial filter having a pass-band for high spatial frequencies.

In such general formulation, the penalty term for the j-th dimension may contain general operators $\zeta^{(j)}$ and be expressed as $$P(f(x_i)) = \sum_{j=1}^{N} \gamma_j \sum_{i=1}^{N} \sum_{m=1}^{M_i} [\zeta^{(j)}(f(x_{i,m}))]^2.$$

The least-square minimization criterion $M(f(x_i))$ may be minimized using known methods. In one instance, a preferably iterative half-quadratic minimization scheme may be used. For performing the half-quadratic minimization, the baseline estimator engine may comprise a half-quadratic minimization engine. The half-quadratic minimization may comprise an iteration mechanism having two iteration stages.

The half-quadratic minimization scheme may e.g. comprise at least part of the LEGEND algorithm, which is computationally efficient. The LEGEND algorithm is described in Idier, J. (2001): *Convex Half-Quadratic Criteria and Interacting Variables for Image Restoration*, IEEE Transactions on Image Processing, 10(7), p. 1001-1009, and in Mazet, V., Carteret, C., Bire, D, Idier, J., and Humbert, B. (2005): *Background Removal from Spectra by Designing and Minimizing a Non-Quadratic Cost Function*, Chemometrics and Intelligent Laboratory Systems, 76, p. 121-133. Both articles are herewith incorporated by reference in their entirety.

The LEGEND algorithm introduces discrete auxiliary data $d(x_i)$ that are preferably of the same dimensionality as the input signal data. The auxiliary data are updated at each iteration depending on the latest initial baseline estimation data, the truncated quadratic term and the input signal data.

In the LEGEND algorithm, the least-square minimization criterion containing only a cost function and no penalty term is minimized using two iterative steps until a convergence criterion is met.

A suitable convergence criterion may, for example, be that the sum of the differences between the current baseline estimation data and the previous baseline estimation data across all locations $x_i$ is smaller than a predetermined threshold.

In a further improvement, the convergence criterion may be expressed as $$\frac{\sum_{i=0}^{N} \sum_{m=0}^{M_i} |f_l(x_{i,m}) - f_{l-1}(x_{i,m})|}{\sum_{i=0}^{N} \sum_{m=0}^{M_i} f_l(x_{i,m}) + f_{l-1}(x_{i,m})} < t,$$

where t is a scalar convergence value which may be set by the user.

As a starting step in the LEGEND algorithm, an initial set of baseline estimation data is defined.

The LEGEND algorithm may be started by selecting a starting set of coefficients $a_k$ for a first baseline estimate $f_0(x_i) = \sum_{k=0}^{K} a_{i,k} x_i^k$ for each of the i=1, ..., N polynomials if a polynomial fit is used.

If a spline fit is used, the initial condition for starting the LEGEND algorithm may be $d(x_i)=0$, $f(x_i)=I(x_i)$ and the iteration is started by entering at the second iterative step.

In the first iterative step, the auxiliary data may be updated as follows:

$$d_l(x_i) = \begin{cases} (2\alpha - 1)(I(x_i) - f_{l-1}(x_i)) & \text{if } \varepsilon(x_i) \leq s \\ -I(x_i) + f_{l-1}(x_i) & \text{else} \end{cases},$$

where l=1 ... L is the index of the current iteration and $\alpha$ is a constant that may be chosen. Preferably, $\alpha$ is close but not equal to 0.5. A suitable value of $\alpha$ is 0.493.

In a second iterative step, the baseline estimation data $f_l(x_i)$ are updated based on the previously calculated auxiliary data $d_l(x_i)$, the baseline estimation data $f_{l-1}(x_i)$ from the previous iteration l-1 and on the penalty term $P(x_i)$.

The baseline estimation data $f_l(x_i)$ may be minimizing a half-quadratic minimization criterion $M(f(x_i))$ which has been modified for the LEGEND algorithm by including the auxiliary data.

In particular, the updated baseline estimation data may be computed using the following formula in the second iterative LEGEND step:

$$f_l(x_i) = \underset{f}{\operatorname{argmin}}[\|I(x_i) - f_{l-1}(x_i) + d_l(x_i)\|^2 + P(f(x_i))]$$

Here, $[\mu I(x_i) - f_{l-1}(x_i) + d_l(x_i)\|^2 + P(f(x_i))]$ represents the modified half-quadratic minimization criterion.

The second iterative step may update the baseline estimation data using the following matrix computation:

$$f_l(x_i) = \left(1 + \sum_{i=1}^{N} \gamma_i A_i^T A_i\right)^{-1} (I(x_i) + d(x_i))$$

Here $(1+\sum_{i=1}^{N} \gamma_i A_i^T A_i)$ is a $(M_1 \times \ldots \times M_N)^2$ dimensional array. In the two-dimensional case, $A_i$ is a $(M_x-1)(M_y-1) \times M_x M_y$ array and given as $$A_i = \begin{pmatrix} \hat{A} & -\hat{A} & \hat{0} & \ldots & \hat{0} \\ \hat{0} & \hat{A} & -\hat{A} & \ddots & \vdots \\ \vdots & \ddots & \ddots & \ddots & \hat{0} \\ \hat{0} & \ldots & \hat{0} & \hat{A} & -\hat{A} \end{pmatrix}$$

with $$\hat{A} = \begin{pmatrix} 1 & -1 & 0 & \ldots & 0 \\ 0 & 1 & -1 & \ddots & \vdots \\ \vdots & \ddots & \ddots & \ddots & 0 \\ 0 & \ldots & 0 & 1 & -1 \end{pmatrix},$$

-continued $$\hat{0} = \begin{pmatrix} 0 & 0 & 0 & \ldots & 0 \\ 0 & 0 & 0 & \ddots & \vdots \\ \vdots & \ddots & \ddots & \ddots & 0 \\ 0 & \ldots & 0 & 0 & 0 \end{pmatrix} \in \mathbb{R}^{(M_x-1) \times M_x}$$

The two iteration steps for updating $d_i(x_i)$ and $f_i(x_i)$ are repeated until the convergence criterion is met.

According to a highly preferable embodiment of the invention, the second step of the LEGEND algorithm is modified using a convolution instead of a matrix computation. This greatly reduces the computational effort.

More particularly, it is preferred that the updated baseline estimation data $f_l(x_i)$ are computed directly by convolving a Green's function with the sum of the input signal data and the updated auxiliary data.

According to a more concrete embodiment of the inventive solution, the second iterative step of the LEGEND algorithm may be replaced by the following iterative step, where the updated baseline estimation data $f_l(x_i)$ is computed in the l-th iteration using a Green's function $G(x_i)$ as follows $$f_l(x_i) = G(x_i) * (I(x_i) + d_l(x_i)).$$

This step reduces the computational burden significantly as compared to the traditional LEGEND algorithm.

The reduced computational burden results from the fact that according to the inventive second iterative step, a convolution is computed. This computation can be efficiently carried out using an FFT algorithm. Moreover, the second iterative step may make full use of an array processor, such as a graphics processing unit or an FPGA due to the FFT algorithm. The computational problem is reduced from $(M_x \times M_y)^2$ to $M_x \times M_y$ if the input signal data and all other arrays are two-dimensional. For a general N-dimensional case, the computational burden is reduced from $(M_1 \times \ldots \times M_N)^2$ dimensional matrix calculations to the computation of a FFT with $(M_1 \times \ldots \times M_N)$-dimensional arrays Thus, the deblurring may be carried out very quickly, preferably in real time for two-dimensional input signal data. A (2 k×2 k) signal data array, here an image, may be deblurred in 50 ms and less.

In one specific embodiment, the Green's function may have the form $$G(x_{i,m}) = F^{-1}\left[\frac{1}{1 - \sum_{j=1}^{N} \gamma_j F\left[D_{i,m}^{(j)}\right]}\right],$$

where $F[\ldots]$ is the discrete N-dimensional Fourier transform, $F^{-1}[\ldots]$ is the inverse discrete N-dimensional Fourier transform, $\gamma_j$ is the regularization parameter of the roughness penalty term, $D_{i,m}^{(j)}$ is a discrete penalty array in the i-th dimension at location m, and N is the total number of dimensions. The upper index $D^{(j)}$ indicates that there may be a different penalty array for each dimension j.

In general, the discrete penalty array $D_{i,m}^{(j)}$ corresponds to the discrete representation of the functional derivative $$\frac{\delta P^{(j)}(f(x_i))}{\delta f(x_{i,m})}$$

of the penalty term $P^{(j)}(f(x_i))$ that is used for the j-th dimension. As all functions are represented by discrete arrays, the differentiation can be carried out numerically by a convolution $$D_{i,m}^{(j)} * P^{(j)}(x_{i,m}),$$

where $D_{i,m}^{(j)}$ is the discrete array for computing the functional derivative $$\frac{\delta}{\delta f(x_{i,m})}.$$

A big advantage of the above Green's function is that any form of penalty term $P(f(x_i))$ may benefit from the fast computation of the second iterative step in the half-quadratic minimization engine. Thus, in the embodiment which uses the Green's function, any penalty term for obtaining a good baseline estimate may be used.

For the general formulation of the penalty term $$P(f(x_i)) = \sum_{j=1}^{N} \gamma_j \sum_{i=1}^{N} \sum_{m=1}^{M_i} [\zeta^{(j)}(f(x_{i,m}))]^2,$$

The array $D_{i,m}^{(j)}$ is defined by $$D_{i,m}^{(j)} * P(f(x_{i,m})) = 0.5 \nabla_f \sum_{i=1}^{N} \sum_{m=1}^{M_i} [\zeta^{(j)} f(x_{i,m})]^2,$$

where $\zeta^{(j)}$ is a general operator of the penalty term, * denotes the N-dimensional convolution and $\nabla_f$ corresponds to the discrete first-order functional derivative in function $f(x_{i,m})$, which may e.g. represent intensity. This equation can be solved by means of the least squares method.

For example, if the penalty term is $$P(f(x_i)) = \sum_{j=1}^{N} \gamma_j \sum_{i=1}^{N} \sum_{m=1}^{M_i} (\partial_j f(x_{i,m}))^2,$$

the derivative array in the convolution may be expressed as:

$$D_{i,m}^{(j)} = \begin{cases} 2 & \text{if } m = 0 \text{ and } i = j \\ -1 & \text{if } m = 1 \text{ or } M_i \text{ and } i = j. \\ 0 & \text{else} \end{cases}$$

The apparatus may comprise a signal storage section, such as an image storage section. The signal storage section may be configured to contain the input signal data, at least temporarily.

The apparatus may comprise a signal output section, such as an image output section. The apparatus may be adapted to output the deblurred signal output data.

The apparatus may further comprise a signal processor, such as an image processor, which may be configured to perform the baseline estimation.

The signal processor may comprise a deblurring section. The deblurring section may be adapted to subtract a baseline contribution, e.g. the baseline estimation data from the input signal data to compute the output signal data.

The signal processor may comprise a baseline estimation engine. The baseline estimation engine may be configured to compute baseline estimation data representing the baseline contribution by a fit to at least a subset of the input signal data.

The baseline estimation engine may comprise a discrete representation of least—square minimization criterion $(M(x_i))$.

The signal processor, which may be configured as an image processor, the baseline estimator engine, the deblurring section and the half-quadratic minimization engine may each be implemented in hardware, in software or as a combination or hardware and software. For example, at least one of the signal processor, the baseline estimator engine, the deblurring section and the half-quadratic minimization engine may be at least partly be implemented by a subroutine, a section of a general-purpose processor, such as a CPU, and/or a dedicated processor such as a CPU, GPU, FPGA, vector processor and/or ASIC.

Another way of implementing the inventive deblurring algorithm is to train an artificial neural network, e. g. a convolutional neural network, using pairs of input signal data and output signal data, where the output signal data have been generated using an embodiment of the above described method. A neural network device which has been trained this way can be regarded as an implementation of the method which has been used to generate the training pairs of input and output signal data. In one particular instance, the signal data may be image data, e.g. as acquired with a microscope and the output signal data may be the images obtained by applying the inventive deblurring algorithm to the input data.

It is to be noted that the inventive deblurring provides best results if the input signal data $I(x_i)$ are—in the case of input image data as input signal data—not convolved or deconvolved before the deblurring. The deconvolution provides the best results if the input data $I(x_i)$ are preprocessed by the inventive deblurring.

Further, the preprocessing by deblurring can enhance the results of images which have been acquired with the technology called SPIM (Selective Plane Illumination Microscopy, also called lightsheet microscopy). In particular, multiple images which have been acquired with the light sheet technology subsequently illuminating a specimen under different directions/orientations might be subject to the deblurring according to an embodiment of the present invention. Multi-image deconvolution is a fusion method of images, which reduces shadows and blur caused by scattering of the lightsheet with the sample to be analyzed (see e.g. the publication "Efficient Bayesian-based multiview deconvolution", Stephan Preibisch et al., Nat Methods., 2014 June, 11(6): 645-648). Either the multiple images which have been acquired with the light sheet technology subsequently illuminating a specimen under different directions/orientations as such and/or the result of such multi-image deconvolution of SPIM-images acquired by different orientations of the lightsheet might be subject to the deblurring according to an embodiment of the present invention. Preprocessing the input images with inventive deblurring, the blur-contribution can be eliminated prior to multi-image deconvolution, which leads to an enhanced fusion result.

Next, the invention is further described by way of example only using a sample embodiment, which is also shown in the drawings. In the drawings, the same reference numerals are used for features which correspond to each other with respect to at least one of function and design.

The combination of features shown in the enclosed embodiment is for explanatory purposes only and can be modified. For example, a feature of the embodiment having a technical effect that is not needed for a specific application may be omitted. Likewise, a feature which is not shown to be part of the embodiment may be added if the technical effect associated with this feature is needed for a particular application.

In the following examples, the input signal data and the output signal data are input image data and output image data respectively for the purpose of explaining the advantages of embodiments of the invention. As is clear from above, any other type of signal data may be used instead of or in addition to image data without any changes to the baseline estimation.

First, the structure of the apparatus 1 is explained with reference to FIG. 1. The apparatus 1 may be a medical observation device, such as an endoscope or a microscope. Just for the purpose of explanation, a microscope 2 is shown as an example of an apparatus 1. For the purpose of the deblurring apparatus and method, there is no difference between endoscopes of microscopes.

The apparatus 1 may comprise a signal-forming section 4, in particular an image-forming section, which is adapted to capture input signal data 6, e.g. with a camera 8. The camera 8 may be a CCD, multispectral or hyperspectral camera which records the input signal data 6, here input image data, in a plurality of channels 10, wherein each channel 10 preferably represents a different light spectrum range from the infrared to the ultraviolet. The input signal data 6 are also designated as $I(x_i)$ in the following.

Other types of input signal data 6 may of course be recorded with devices or sensors other than a camera, e.g. one or more microphones, vibrational sensors, accelerometers, velocity sensors, antennas, pressure transducers, temperature sensors, capacitive sensors, magnetic sensors, and any combination thereof.

In the case of a CCD camera, for example, three channels 10, e.g. a R-channel, a G-channel and a B-channel, may be provided to represent a visible light image of an object 12. In the case of a multi- or hyperspectral camera, a total of more than three channels 10 may be used in at least one of the visible light range, the IR light range, the NIR light range and the ultraviolet light range.

The object 12 may comprise animate and/or inanimate matter. The object 12 may further comprise one or more fluorescent materials, such as at least one fluorophore 14. A multispectral or hyperspectral camera may have a channel 10 for each different fluorescence spectrum of the fluorescent materials in the object 12. For example, each fluorophore 14 may be represented by at least one channel 10 which is matched to the fluorescence spectrum triggered by an illumination 16. Alternatively or additionally, channels 10 may be provided for auto-fluorescence spectra or for spectra of secondary fluorescence, which is triggered by fluorescence excited by the illumination 16, or for lifetime fluorescence data. Of course, the illumination 16 may also or solely emit white light or any other composition of light without triggering fluorescence in the object 12. The microscope 2 may be adapted to excite fluorescence e.g. of fluorophores 14 within an object 12 with light having a suitable fluorescence excitation wavelength by the illumination 16.

The illumination may be guided through a lens 17, through which also the input signal data are acquired. The illumination 16 may comprise or consist of one or more flexible light guides to direct light onto the object 12 from one or more different directions. A suitable blocking filter (not shown) may be arranged in the light path in front of the camera 8, e.g. to suppress glare. In case of fluorescence, a blocking filter preferably blocks only the illumination wavelength and allows the fluorescent light of the fluorophores 14 in the object 12 to pass to the camera 8.

It is apparent—without limitation to the general—that the input signal data 6 can be captured by any kind of microscope, in particular with a fluorescence light microscope operable in a widefield mode and/or using a confocal laser scanning microscope.

The input signal data 6 are two-dimensional if a single channel 10 is contained in a two-dimensional image. The input image may have a higher dimensionality than two if more than one channel 10 is comprised and/or if the input signal data 6 represent a three-dimensional array, such as a three-dimensional image.

Three-dimensional input signal data 6 or input image data may be recorded by the apparatus 1 by e.g. using light-field technology, z-stacking in microscopes, images obtained by a SCAPE microscope and/or a three-dimensional reconstruction of images obtained by a SPIM microscope. In the case of a three-dimensional image, each plane of the three-dimensional input signal data 6 may be considered as a two-dimensional input image 6. Again, each plane may comprise several channels 10.

Each channel 10 may be regarded as a separate two-dimensional image or signal. Alternatively, a plurality of channels may together be interpreted as a multi-dimensional array.

The input signal data are a digital representation of a quantity $I(x_i)$, such as an intensity, where $x_i$ represents a location in the input signal data 6 and I is the quantity at that location. The term $x_i$ is a shortcut notation for a tuple $\{x_1; \ldots; x_N\}$ containing N dimensions and representing a discrete location $x_i$ in the discrete input signal data. A location $x_i$ may be a pixel or a preferably coherent set of pixels in the input signal data. The discrete location $x_i$ denotes e.g. a pair of discrete location variables $\{x_1; x_2\}$ in the case of two-dimensional input signal data and a triplet of discrete location variables $\{x_1; x_2; x_3\}$ in the case of three-dimensional input signal data. In the i-th dimension, the array may contain $M_i$ locations, i.e. $x_i = \{x_{i,1}, \ldots, x_{i,M_i}\}$. In total, $I(x_i)$ may contain $(M_1 \times \ldots \times M_N)$ elements.

The camera 8 may produce a time series 18 of subsequent sets of input signal data 6.

The apparatus 1 may further comprise a signal storage section, in particular an image storage section, 20 which is adapted to contain, at least temporarily, the input signal data 6. The signal storage section 20 may comprise a volatile or non-volatile memory, such as a cache memory of a CPU 22 of a computing device 24, such as a PC, and/or of a GPU 26. The image storage section 20 may further comprise RAM, a hard disk drive or an exchangeable storage system, such as a USB stick or an SD card. The image storage section 20 may comprise any combination of these types of memory.

For acquiring the input signal data 6, e.g. from the camera 8, a signal input section, in particular an image input section, 28 may be provided. The signal input section 28 may comprise standardized connection means 30, such as standardized data exchange protocols, hardware connectors and/or wireless connections. Examples of standardized connectors which may be connected to the camera 8 are HDMI, USB and RJ45 connectors.

The apparatus 1 may further comprise a signal output section, in particular an image output section, 32 which may comprise standardized connection means 34, such as standardized data exchange protocols, hardware connectors and/or wireless connections, each configured to output deblurred output signal data 36 to one or more displays 37. The output signal data 36, here output image data, have preferably the same dimensionality as the input signal data 6, and are represented by a discrete array of discrete values $O(x_i)$.

For computing the deblurred output signal data 36 from the input signal data 6, a signal processor, in particular an image processor, 38 may be provided. The signal processor 38 and its constituents may be at least partly hardware, at least partly software and/or a combination of both hardware and software. For example, the signal processor 38 may comprise at least one of a CPU 22 and a GPU 26 of the computing device 24, as well as sections that have been coded in software and temporarily exist as structural entities in the CPU 22 and/or the GPU 26 as an operational state. The signal processor 38 may also comprise additional hardware such as one or more ASICs which have been specifically designed in carrying out operations required for the apparatus and method according to embodiments of the invention.

Figure 11:
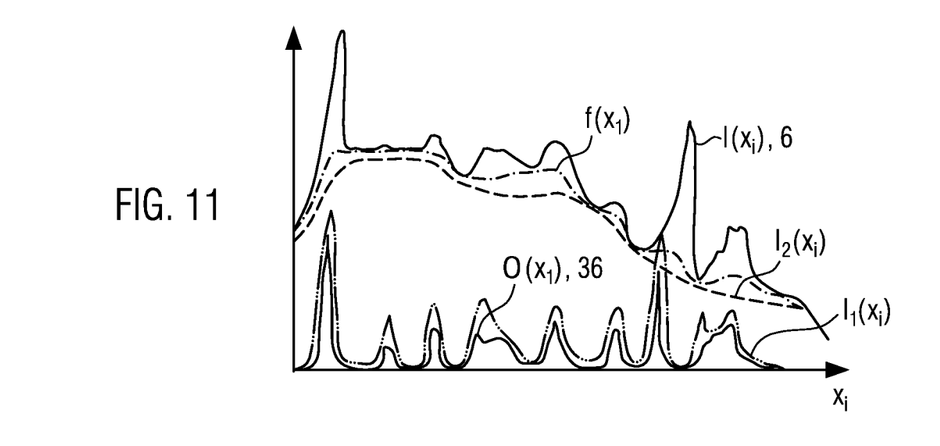
FIG. 11 shows a schematic representation of input signal data, an in-focus contribution in the input signal data, an out-of-focus contribution in the input signal data, baseline estimation data and output signal data.

Before continuing the further description of FIG. 1, the general principle of the deblurring of the input signal data 6 is explained with reference to FIG. 11. For the deblurring of the input signal data 6, the signal processor 38 may comprise a deblurring section 40.

The input signal data $I(x_i)$ are assumed to be composed additively from an out-of-focus component $I_2(x_i)$ and an in-focus component $I_1(x_i)$. The in-focus component $I_1(x_i)$ contains solely the information from the focal plane of the camera 8. The out-of-focus component $I_2(x_i)$ results from light recorded in the input signal data 6 from regions outside the focal region. The in-focus component $I_1(x_i)$, in contrast, represents only contributions from the focal region. Neither $I_1(x_i)$ nor $I_2(x_i)$ are known and therefore have to be estimated.

According to an embodiment of the invention, it is assumed that the out-of-focus or baseline component $I_2(x_i)$ consists only of components having low spatial frequency which this represent something like a smooth baseline, about which the in-focus component $I_1(x_i)$ fluctuates at a higher spatial frequency. The out-of-focus component $I_2(x_i)$ is smooth and has large length scales; the in-focus component $I_1(x_i)$ is, by contrast, not smooth and usually contains peaks.

For the deblurring of the input signal data, an estimate for the out-of-focus or baseline component $I_2(x_i)$ is computed. This estimate is represented in the apparatus 1 and the method according to an embodiment of the invention as baseline estimation data $f(x_i)$. The baseline estimation data are a discrete array that has preferably the same dimensionality as the input signal data 6 and/or the output signal data 36. The baseline estimation data $f(x_i)$ are indicated by reference number 44 in FIG. 1. The baseline estimation data $f(x_i)$ may also be at least temporarily present in storage section 20. Once the baseline estimation data have been computed, the output signal data, here represented as $O(x_i)$ are obtained by subtracting the baseline estimation data from the input signal data at each location.

Figure 1:
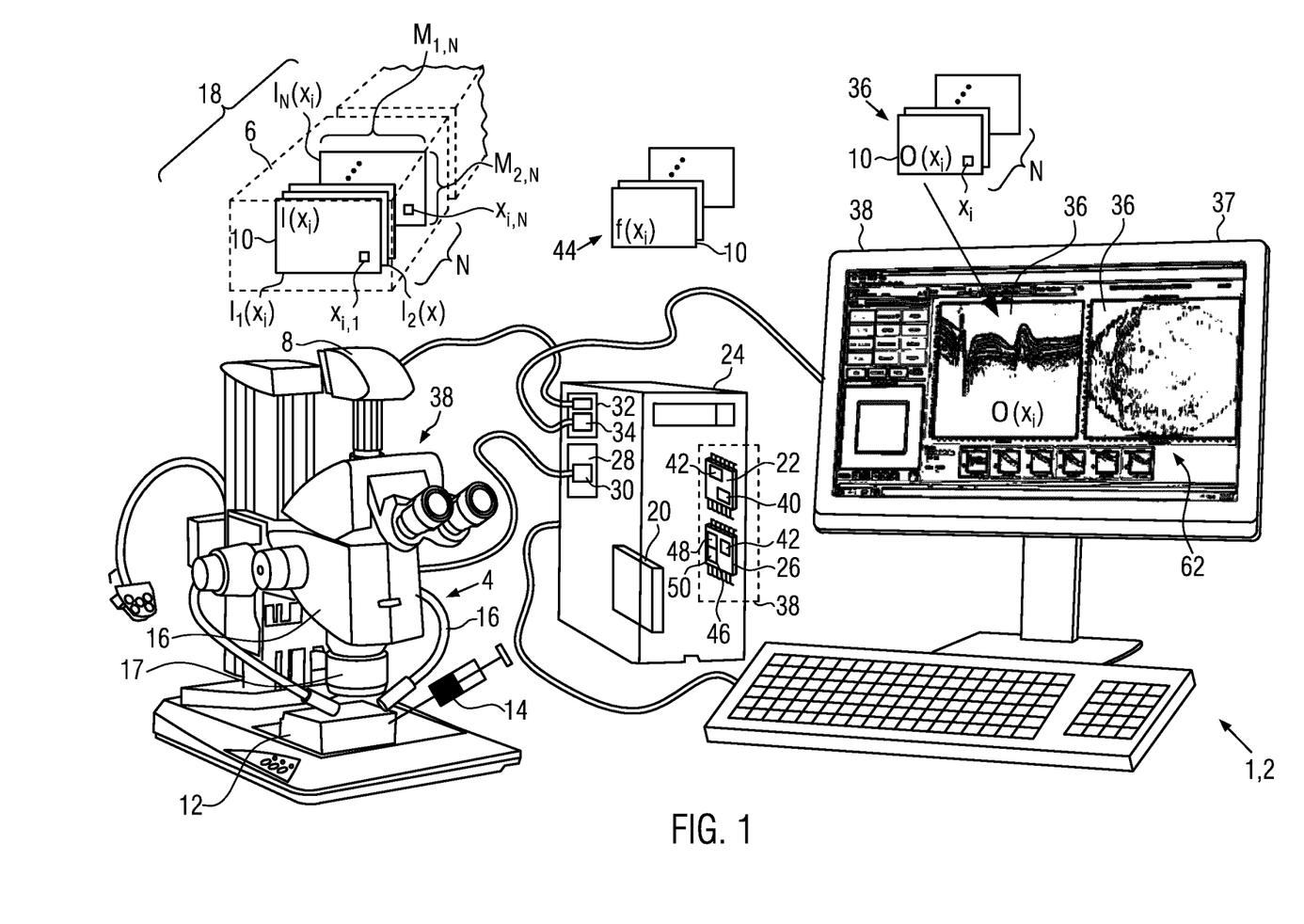
FIG. 1 shows a schematic representation of an apparatus according to an embodiment of the invention.

According to FIG. 1, the signal or image processor 38 may comprise a baseline estimator engine 42, which is configured to compute the baseline estimation data $f(x_i)$, in FIG. 1 indicated at reference numeral 44, by a fit to at least a subset of the input signal data 6. Preferably, the fit to at least the subset of the input signal data is a spline fit.

For a computationally efficient spline fit, the baseline estimator engine 42 may comprise a half-quadratic minimization engine 46, which may, for example, be a subroutine or a combination of a hard-wired algorithm and a matching software. The half-quadratic minimization engine 46 may be configured to execute a half-quadratic minimization scheme and, towards this end, may comprise two iteration stages 48, 50.

According to an embodiment of the invention, the half-quadratic minimization engine 46 uses a convolution to compute the baseline estimation data 44 in the second iteration stage 50. As the convolution can be computed more efficiently on an array processor using a FFT, it is preferred that the signal processor 38 includes an array processor such as a GPU 26. In operation, the signal processor comprises the half-quadratic minimization engine 46.

Figure 2:
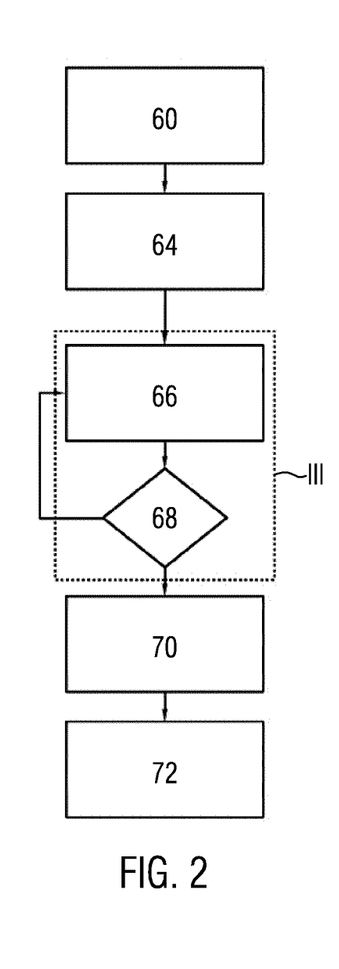
FIG. 2 shows a schematic rendition of a flow chart for the method according to an embodiment of the invention.

With reference to FIG. 2, the steps of computing the deblurred output signal data $O(x_i)$ or 36 from the input signal data $I(x_i)$ or 6 are described as they are performed by the apparatus 1. It is to be noted that, preferably, each channel 10 is handled separately.

In a first step 60, various parameters of the baseline estimator engine 42, which need to be preset, may be defined by a user, e.g. using a graphical user interface 62 (FIG. 1). The parameters may comprise the type of fit to the input signal data 6 that is to be performed by the baseline estimator engine 42. For example, a user may choose between a polynomial fit and a spline fit of the baseline estimation data 44 to the input signal data 6.

Further, the user may choose between a variety of penalty terms $P(f(x_i))$ which are used in the half-quadratic minimization scheme. The penalty term determines the shape of the baseline estimate by penalizing the representation of components of the in-focus contribution $I_1(x_i)$ in the baseline estimation data.

For example, the user may be presented with a selection of various penalty terms that penalize non-smooth characteristics of the baseline estimation data 44. For instance, the penalty term may be a high-pass spatial frequency filter for the baseline estimation data 44, which gets larger if the baseline estimation data 44 contain components having high spatial frequency. Other penalty terms may include a gradient of the baseline estimation data 44. Another example of a penalty term may be the curvature of the baseline estimation data 44. Further, feature extracting filters, such as a Sobel, Laplace and/or FIR band-pass, high-pass or low-pass filter may be selected by the user as penalty term. Further, a linear combination of any of the above may be selected. Different penalty terms may be selected for different dimensions or for different channels of the input signal data 6.

The general representation of the penalty term is as follows $$P(f(x_i)) = \Sigma_{j=1}^{N} \gamma_j \Sigma_{i=1}^{N} \Sigma_{m=1}^{M_i} [\zeta^{(j)}(f(x_{i,m}))]^2,$$

where $\zeta^{(j)}$ is a general operator of the penalty term, which defines the property of the penalty term.

In the following, it is assumed that the user selects a gradient-based roughness penalty term based on the gradient of the baseline estimation data $f(x_{i,m})$ or 44 having the following form $$P(f(x_i)) = \Sigma_{j=1}^{N} \gamma_j \Sigma_{i=1}^{N} \Sigma_{m=1}^{M_i} (\partial_j f(x_{i,m}))^2.$$

This penalty term penalizes large gradients in the baseline estimation data. The operator $\partial_j$ represents a first-order derivative or gradient in the dimension j.

Using the above gradient-based penalty term, the parameters to be specified by the user may further comprise an array $\gamma_j$ of regularization parameters. For the gradient-based penalty term, the regularization parameter array may be between 0.3 and 100.

Further, when selecting a parameter for the baseline estimator engine, the user may choose between a symmetric and asymmetric quadratic term $\varphi(\varepsilon(x_i))$, which also determines the shape of the baseline estimate by specifying the effect of large peaks on the baseline estimation data.

Finally, the user may select a convergence criterion and/or a threshold value t which has to be reached by the convergence criterion.

For example, the user may select the following asymmetric, truncated quadratic:

$$\varphi(\varepsilon(x_i)) = \begin{cases} (I(x_i) - f(x_i))^2 & \text{if } \varepsilon(x_i) \le s \\ s^2 & \text{else} \end{cases},$$

in which s represents a threshold value which is to be input by the user. The threshold value defines a maximum deviation between the input signal data and the baseline estimation data. Peaks above the baseline estimate do not attract the baseline estimate more than a peak which deviates by the threshold value.

After the initial parameters for the baseline estimator engine 42 have been set, the data are initialized in step 64 for the iterative half-quadratic minimization scheme 66.

From then on, the iterative half-quadratic minimization scheme 66 is carried out by the half-quadratic minimization engine 46 until a convergence criterion 68 is met. In the embodiment, the following convergence criterion is used:

$$\frac{\sum_{i=0}^{N} \sum_{m=0}^{M_i} |f_l(x_{i,m}) - f_{l-1}(x_{i,m})|}{\sum_{i=0}^{N} \sum_{m=0}^{M_i} f_l(x_{i,m}) + f_{l-1}(x_{i,m})} < t,$$

where l indicates the current iteration and t is a constant scalar threshold value which may be user-specified.

If the convergence criterion 68 is met, it is assumed that the baseline estimation data 44 have been successfully computed. Thus, the baseline estimation data $f(x_i)$ are subtracted from the input signal data $I(x_i)$ to obtain the deblurred output signal data $O(x_i)$ in step 70.

After the computation of the output signal data $O(x_i)$ a post-processing operation 72 may be carried out on the output signal data 36, such as a deconvolution.

The output signal data $O(x_i)$ may be displayed with or without post-processing on the display 37.

Figure 3:
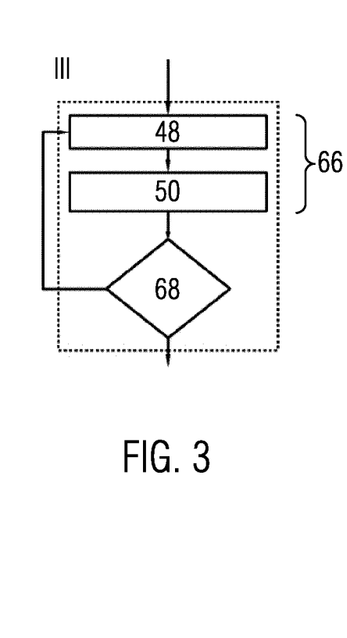
FIG. 3 shows a detail of FIG. 2.

In FIG. 3, detail III of FIG. 2 is shown to explain the half-quadratic minimization scheme 66 in closer detail. The half-quadratic minimization scheme 66 comprises the first iteration stage 48 and the second iteration stage 50.

In principle, the half-quadratic minimization scheme 66 as carried out by the half-quadratic minimization engine 46 may be the LEGEND algorithm. However, according to an embodiment of the invention it is preferred to modify the second step of the LEGEND algorithm may be modified to significantly reduce the computational burden.

In the shown embodiment, the second iterative stage 50 is entered after initializing the data at step 64. At this point, the first estimate $f_1(x_i)$ of the baseline estimation data is computed by using a convolution of the input signal data with a Green's function $G(x_i)$.

$$f_1(x_i) = G(x_i) * I(x_i)$$

For the gradient-based penalty term used in this embodiment, the Green's function is defined as follows:

$$G(x_{i,m}) = F^{-1}\left[\frac{1}{1 - \Sigma_{j=1}^{N} \gamma_j F[D_{i,m}^{(j)}]}\right],$$

where F[ . . . ] is the discrete N-dimensional Fourier transform, $F^{-1}$[ . . . ] is the inverse discrete N-dimensional Fourier transform, $\gamma_j$ is the regularization parameter of the roughness penalty term and $$D_{i,m}^{(j)} = \begin{cases} 2 & \text{if } m = 0 \text{ and } i = j \\ -1 & \text{if } m = 1 \text{ or } M_i \text{ and } i = j \\ 0 & \text{else} \end{cases}$$

Then, in the first iteration stage 48, an updated version of auxiliary data $d_l(x_i)$ may be computed using the current baseline estimation data 44 as follows:

$$d_l(x_i) = \begin{cases} (2\alpha - 1)(I(x_i) - f_{l-1}(x_i)) & \text{if } \varepsilon(x_i) \le s \\ -I(x_i) + f_{l-1}(x_i) & \text{else} \end{cases}.$$

The parameter α is a constant which may have been specified by the user.

Next, in the second iterative stage 50, the updated baseline estimation data 44 are computed using the updated auxiliary data $d_l(x_i)$ of the current iteration l as follows $$f_l(x_i) = G(x_i) * (I(x_i) + d_l(x_i))$$

In the next step, it is checked whether the convergence criterion 68 is met. If this is not the case, the half-quadratic minimization scheme 66 proceeds to iterative step 48 using the updated baseline estimation data $f_l(x_i)$.

In the following, two examples of deblurred output signal data are given, in which the gradient-based penalty term was used together with the second iterative step using the convolution with the Green's function as described with reference to FIGS. 2 and 3.

Figure 4:
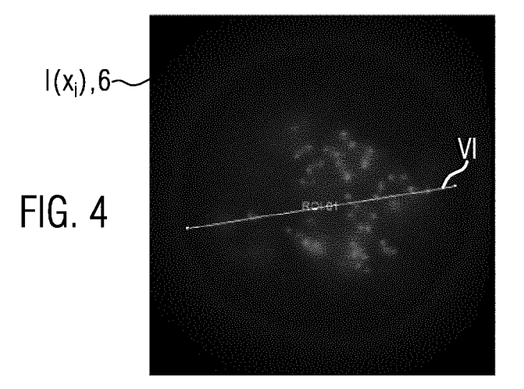
FIG. 4 shows an example of input signal data.
Figure 5:
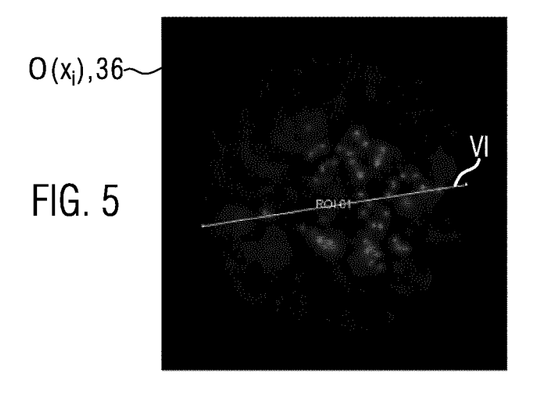
FIG. 5 shows an example of deblurred output signal data derived from the input signal data of FIG. 4.

FIG. 4 shows the input signal data $I(x_i)$ or 6 of a sample picture, FIG. 5 shows the deblurred output signal data $O(x_i)$ or 36. FIG. 4 shows a picture of mitochondria recorded with a DM6000 widefield microscope and a HCX PL APO CS 100.0×1.40 OIL at a numerical aperture of 1.4 and a peak emission of 645 nm. The size of a pixel corresponds to 40 nm.

Figure 6:
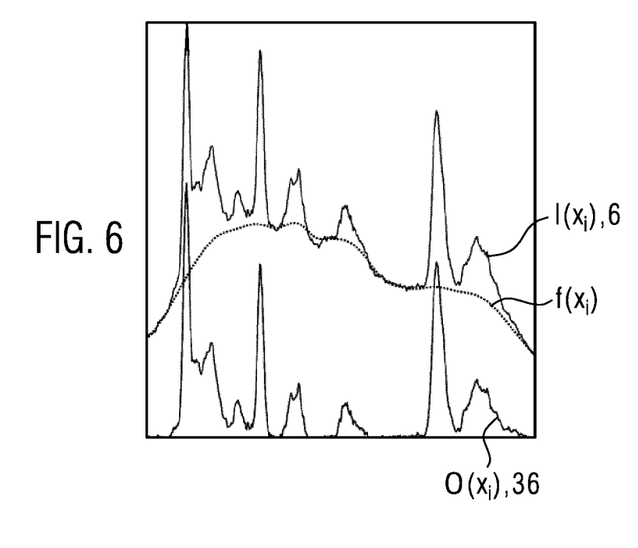
FIG. 6 shows the intensity distribution in the input signal data, baseline estimation data and the deblurred output signal data along lines VI of FIGS. 4 and 5.

From the comparison of FIGS. 4 and 5 it can be seen that a significant part of the out-of-focus component $I_2(x_i)$ has been removed in the output signal data. This is verified by FIG. 6, which shows the intensity distribution along the line VI in FIGS. 4 and 5, respectively. It can be seen that the baseline estimation data $f(x_i)$ represent a smooth baseline in the intensity distribution, whereas the peaks are maintained in the output signal data $O(x_i)$, 36.

Figure 7:
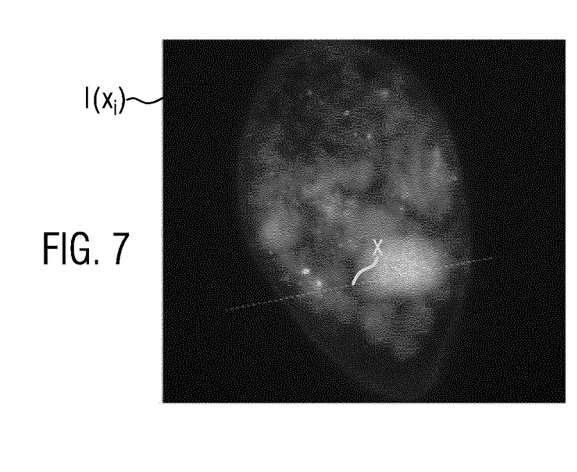
FIG. 7 shows another example of input signal data.

The deblurring also works well if the intensity distribution in the input signal data $I(x_i)$ has a different characteristic. This is demonstrated in FIGS. 7, 8 and 10, which show a Paramecium. Whereas FIG. 4 contains a single bead-like structure, in which it is comparatively easy to distinguish the in-focus contribution from the out-of-focus contribution, FIG. 7 contains a more complex structure. In FIG. 7, a pixel corresponds to 65 nm. The image was recorded using a DM8 widefield microscope with a HCX FLUOTAR 100×/1.30 OIL lens at a numerical aperture of 1.3 and a peak emission at 520 nm.

Figure 8:
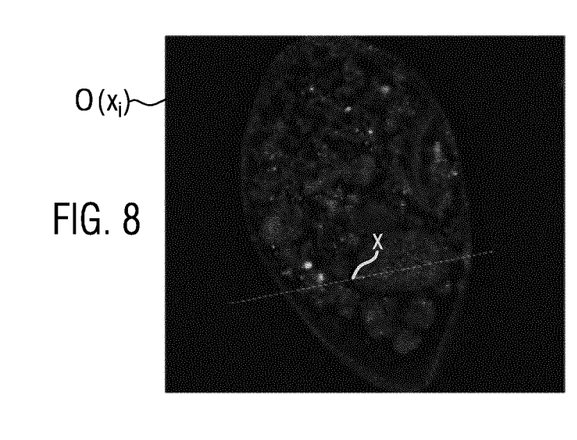
FIG. 8 shows the output signal data based on the input signal data of FIG. 7.
Figure 10:
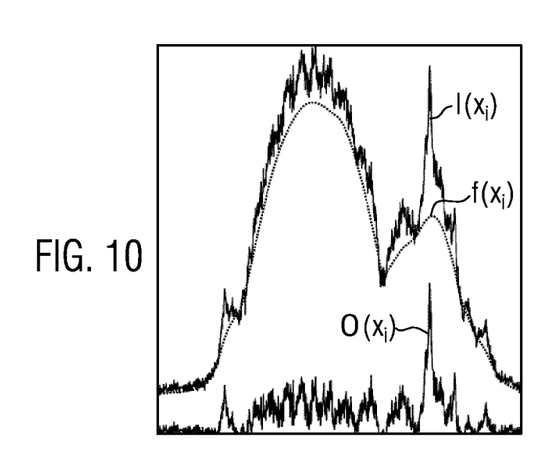
FIG. 10 shows the intensity distribution in the input signal data, the baseline estimation data and output signal data along line X in FIGS. 7 and 8.

In FIG. 7, the input signal data $I(x_i)$ are shown. In FIG. 8, the deblurred output signal data $O(x_i)$ are shown. In FIG. 10, the intensity distributions of the input signal data 6, the baseline estimation data 44 and the output signal data 36 along line X of FIGS. 7 and 8 are indicated. As can be seen, the baseline estimation data $f(x_i)$ also contains peaks. However, the length scale of these peaks is significantly larger than the intensity variation in the output signal data $O(x_i)$.

Figure 9:
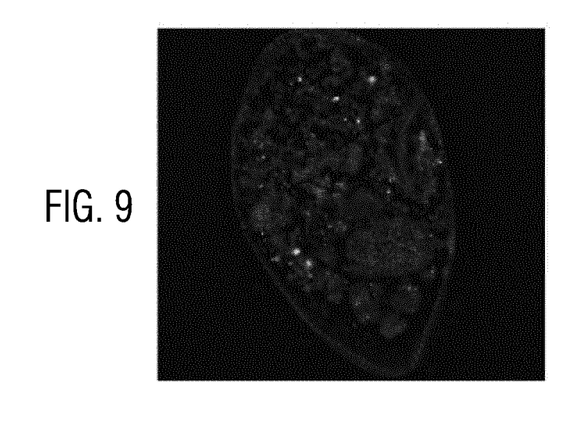
FIG. 9 shows the output signal data of FIG. 8 after deconvolution.

FIG. 9 shows the output signal data 36 after deconvolution. As the output signal data have been deblurred, the result of the convolution has a very good quality with almost no artifacts.

Thus, to summarize, an apparatus 1 and method for deblurring input signal data have been described. The apparatus and method may use a penalty term of any discrete derivative order of the baseline estimation data and/or of feature-extracting filters. Independently of whether a penalty term is used or not, a spline fit may be preferred over the polynomial fit in order to create a smooth baseline estimate. As a third independent aspect of an embodiment of the invention, a half-quadratic minimization engine 46 is proposed, which reduces computational burden significantly by introducing a convolution in the second iterative stage 50. The computational efficiency may be preserved for a wide range of penalty terms.

It is to be noted, that the dimensionality of the data may be changed by rearranging arrays. For example, two-dimensional data may be rendered as one or more sets of one-dimensional data. This may be achieved by stringing subsequent rows or columns behind one another. Further, three-dimensional data may be reduced to two-dimensional data, by stringing subsequent planes one behind each other. By using this principle recursively, any N-dimensional data may be reduced to one or two-dimensional data to which the scheme described above may be applied.

Vice versa, any one-dimensional array may be arranged as a two or higher dimensional array by simply braking it up in smaller one-dimensional array and index those smaller arrays, which preferably have the same length, in a two or higher dimensional scheme. Further, any type of data may be regarded and displayed as image data or as an image, e.g. by assigning a greyscale intensity to each value of the input signal data and displaying it in a two or three-dimensional arrangement, as described above.

As used herein the term "and/or" includes any and all combinations of one or more of the associated listed items and may be abbreviated as "/".

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a processor, a microprocessor, a programmable computer or an electronic circuit. In some embodiments, some one or more of the most important method steps may be executed by such an apparatus.

Depending on certain implementation requirements, embodiments of the invention can be implemented in hardware or in software. The implementation can be performed using a non-transitory storage medium such as a digital storage medium, for example a floppy disc, a DVD, a Blu-Ray, a CD, a ROM, a PROM, and EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may, for example, be stored on a machine readable carrier.

Other embodiments comprise the computer program for performing one of the methods de-scribed herein, stored on a machine readable carrier.

In other words, an embodiment of the present invention is, therefore, a computer program having a program code for performing one of the methods described herein, when the computer program runs on a computer.

A further embodiment of the present invention is, therefore, a storage medium (or a data carrier, or a computer-readable medium) comprising, stored thereon, the computer program for performing one of the methods described herein when it is performed by a processor. The data carrier, the digital storage medium or the recorded medium are typically tangible and/or non-transitionary. A further embodiment of the present invention is an apparatus as described herein comprising a processor and the storage medium.

A further embodiment of the invention is, therefore, a data stream or a sequence of signals representing the computer program for performing one of the methods described herein. The data stream or the sequence of signals may, for example, be configured to be transferred via a data communication connection, for example, via the internet.

A further embodiment comprises a processing means, for example, a computer or a programmable logic device, configured to, or adapted to, perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example, a field programmable gate array) may be used to perform some or all of the functionalities of the methods described herein. In some embodiments, a field programmable gate array may cooperate with a micro-processor in order to perform one of the methods described herein. Generally, the methods are preferably performed by any hardware apparatus.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE NUMERALS 1 apparatus
2 microscope
4 signal-forming section
6 input signal data, input image data, $I(x_i)$
8 camera
10 channel
12 object
14 fluorophore
16 illumination
17 lens
18 time series of input signal data
20 image storage section
22 CPU
24 computing device
26 GPU
28 signal input section
30 connection means of signal input section
32 signal output section
34 connection means of signal output section
36 output signal data, output image data, $O(x_i)$
37 display
38 signal processor
40 deblurring section
42 baseline estimator engine
44 baseline estimation data, $f(x_i)$
46 half-quadratic minimization engine
48 first iteration stage
50 second iteration stage
60 setup of baseline estimation parameters
62 graphical user interface
64 initializing of half-quadratic minimization engine and scheme
66 half-quadratic minimization engine and scheme
68 convergence criterion
70 computation of output signal data
72 post-processing operation

The invention claimed is:

1. An apparatus for baseline estimation in input signal data, wherein the apparatus is configured to:
   retrieve input signal data ($I(x_i)$);
   compute baseline estimation data ($f(x_i)$) by an iterative half-quadratic minimization scheme comprising a first iterative stage and a second iterative stage, wherein, in the first iterative stage, auxiliary data ($d(x_i)$) are updated depending on baseline estimation data ($f_{l-1}$ ($x_i$)) of a previous iteration, a truncated quadratic term ($\varphi(\varepsilon(x_i))$) and the input signal data ($I(x_i)$) and, in the second iterative stage, the baseline estimation data ($f(x_i)$) are computed using a convolution of a discrete Green's function ($G(x_i)$) with a sum of the input signal data ($I(x_i)$) and the updated auxiliary data ($d(x_i)$); and subtract the baseline estimation data ($f(x_i)$) from the input signal data ($I(x_i)$) to compute output signal data; and train a neural network using the output signal data as computed from the input signal data.

2. The apparatus according to claim 1, wherein the iterative half-quadratic minimization scheme is a LEGEND algorithm comprising a half-quadratic minimization criterion ($M(f(x_i))$), the least-square minimization criterion comprising a cost function $C(f(x_i))$.

3. The apparatus according to claim 2, wherein the cost function $C(f(x_i))$ comprises a truncated quadratic ($\varphi(\varepsilon(x_i))$), the truncated quadratic being one of symmetric and asymmetric.

4. The apparatus according to claim 1, wherein the Green's function is defined as follows:

$$G(x_{i,m}) = F^{-1}\left[\frac{1}{1 - \sum_{j=1}^{N} \gamma_j F\left[D_{i,m}^{(j)}\right]}\right],$$

where $F[\bullet\bullet\bullet]$ is the discrete N-dimensional Fourier transform, $F^{-1}[\bullet\bullet\bullet]$ is the inverse discrete N-dimensional Fourier transform, $\gamma_j$ is the regularization parameter of the roughness penalty term and $$D_{i,m}^{(j)} = \begin{cases} 2 & \text{if } m = 0 \text{ and } i = j \\ -1 & \text{if } m = 1 \text{ or } M_i \text{ and } i = j \\ 0 & \text{else} \end{cases}$$

$D_{i,m}^{(j)}$ being a discrete penalty array in the i-th dimension at location m, and N the total number of dimensions.

5. The apparatus according to claim 1, wherein the Green's function comprises a discrete representation functional derivative $$\left(\frac{\delta P^{(j)}(f(x_i))}{\delta f(x_{i,m})}\right)$$

of the penalty term ($P^{(j)}(f(x_i))$).

6. The apparatus according to claim 5, wherein the penalty term ($P^{(j)}(f(x_i))$) comprises at least one of a gradient of the baseline estimation data, a curvature of the baseline estimation data, a feature-extracting linear filter, a high-pass filter, a low-pass filter, a Sobel filter, a Laplace filter, a FIR band-pass filter, a derivative of arbitrary order of the baseline estimation data ($f(x_i)$), and a linear combination of any one the aforementioned penalty terms.

7. The apparatus according to claim 5, wherein different penalty terms are used for different dimensions of the input signal data.

8. The apparatus according to claim 1, wherein the input signal data are one of input image data, input sonar, sound and/or ultrasound data, input radar data, input spectral data, input cepstral data, input seismographic data, input statistical data, input tomography data, input microwave data, and input vibrational data.

9. The apparatus according to claim 1, wherein the output signal data are one of output image data, output sonar, sound and/or ultrasound data, output radar data, output spectroscopy data, output cepstral data, output seismographic data, output statistical data, output tomography data, output microwave data, and output vibrational data.

10. A method for baseline estimation in input signal data, the method comprising:
retrieving input signal data ($I(x_i)$);
computing baseline estimation data ($f(x_i)$) by an iterative half-quadratic minimization scheme, wherein the iterative half-quadratic minimization scheme comprises a first iterative stage and a second iterative stage, wherein, in the first iterative stage, auxiliary data ($d(x_i)$) are updated depending on baseline estimation data ($f(x_i)$) of a previous iteration, a truncated quadratic term ($\varphi(\varepsilon(x_i))$) and the input signal data ($I(x_i)$) and, in the second iterative stage, the baseline estimation data ($f(x_i)$) are computed using a convolution of the discrete Green's function ($G(x_i)$) with a sum of the input signal data ($I(x_i)$) and the updated auxiliary data ($d(x_i)$);
subtracting the baseline estimation data from the input signal data ($I(x_i)$) to obtain output signal data ($O(x_i)$); and
training a neural network using the output signal data as computed from the input signal data.

11. The method according to claim 10, wherein the truncated quadratic term ($\varphi(\varepsilon(x_i))$) is one of symmetric and asymmetric.

12. The method according to claim 10, wherein the discrete Green function ($G(x_i)$) contains a penalty term ($P(f(x_i))$) which penalizes non-smooth baseline estimation data ($f(x_i)$).

13. A tangible, non-transitory computer-readable medium with a program code which, upon execution by one or more processors, facilitates performance of the method according to claim 10.

14. A neural network device trained by input and output signal data, wherein the output signal data was created from the input signal data by a method comprising:
retrieving the input signal data ($I(x_i)$);
computing baseline estimation data ($f(x_i)$) by an iterative half-quadratic minimization scheme, wherein the iterative half-quadratic minimization scheme comprises a first iterative stage and a second iterative stage, wherein, in the first iterative stage, auxiliary data ($d(x_i)$) are updated depending on baseline estimation data ($f(x_i)$) of a previous iteration, a truncated quadratic term ($\varphi(\varepsilon(x_i))$) and the input signal data ($I(x_i)$) and, in the second iterative stage, the baseline estimation data ($f(x_i)$) are computed using a convolution of the discrete Green's function ($G(x_i)$) with a sum of the input signal data ($I(x_i)$) and the updated auxiliary data ($d(x_i)$); and
subtracting the baseline estimation data from the input signal data ($I(x_i)$) to obtain the output signal data ($O(x_i)$).

15. A neural network device trained by input and output signal data, wherein the output signal data was created from the input signal data by a method comprising:
retrieving input signal data ($I(x_i)$);
estimating a baseline contribution ($I_2(x_i)$) in the input signal data ($I(x_i)$) to obtain baseline estimation data ($f(x_i)$); and
subtracting the baseline estimation data from the input signal data ($I(x_i)$) to obtain output signal data ($O(x_1)$), wherein the step of obtaining the baseline estimation data ($f(x_i)$) comprises the steps of computing the baseline estimation data ($f(x_i)$) using a convolution with a discrete Green's function ($G(x_i)$) containing a penalty term ($P(f(x_i))$) which penalizes non-smooth baseline estimation data ($f(x_i)$).

* * * * *